(12) United States Patent
Bunker et al.

(10) Patent No.: US 8,673,397 B2
(45) Date of Patent: Mar. 18, 2014

(54) METHODS OF FABRICATING AND COATING A COMPONENT

(75) Inventors: Ronald Scott Bunker, Waterford, NY (US); Dennis Michael Gray, Delanson, NY (US); Don Mark Lipkin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 8 days.

(21) Appl. No.: 12/943,646

(22) Filed: Nov. 10, 2010

(65) Prior Publication Data
US 2012/0114912 A1 May 10, 2012

(51) Int. Cl.
*B05D 5/00* (2006.01)

(52) U.S. Cl.
USPC .......... 427/256; 427/270; 427/271; 416/96 R; 416/97 R; 416/241 R

(58) Field of Classification Search
USPC ............ 427/256, 270, 271; 29/889.721, 29/889.722; 415/1, 115, 116, 117, 177, 415/178, 180; 416/96 R, 97 R, 241 R
See application file for complete search history.

(56) References Cited

U.S. PATENT DOCUMENTS

| | | | |
|---|---|---|---|
| 5,626,462 A | 5/1997 | Jackson et al. |
| 5,640,767 A | 6/1997 | Jackson et al. |
| 5,875,549 A | 3/1999 | McKinley |
| 6,214,248 B1 | 4/2001 | Browning et al. |
| 6,234,755 B1 | 5/2001 | Bunker et al. |
| 6,321,449 B2 | 11/2001 | Zhao et al. |
| 6,368,060 B1 | 4/2002 | Fehrenbach et al. |
| 6,412,541 B2 | 7/2002 | Roesler et al. |
| 6,551,061 B2 | 4/2003 | Darolia et al. |
| 6,582,194 B1 | 6/2003 | Birkner et al. |
| 6,602,053 B2 | 8/2003 | Subramanian et al. |

(Continued)

FOREIGN PATENT DOCUMENTS

EP 1387040 B1 6/2006

OTHER PUBLICATIONS

D. G. Hyams et al., "A Detailed Analysis of Film Cooling Physics: Part III—Streamwise Injection With Shaped Holes," Journal of Turbomachinery, vol. 122, Issue 1, Jan. 2000, pp. 122-132.

(Continued)

*Primary Examiner* — Michael Cleveland
*Assistant Examiner* — Xiao Zhao
(74) *Attorney, Agent, or Firm* — Ann M. Agosti

(57) ABSTRACT

A component is disclosed. The component comprises a substrate comprising an outer surface and an inner surface, where the inner surface defines at least one hollow, interior space, where the outer surface defines one or more grooves, and where each of the one or more grooves extends at least partially along the surface of the substrate and has a base. One or more access holes extend through the base of a respective groove to place the groove in fluid communication with respective ones of the at least one hollow interior space. The component further comprises a coating disposed over at least a portion of the substrate surface, where the coating comprises one or more layers. At least one of the layers defines one or more permeable slots, such that the respective layer does not completely bridge each of the one or more grooves. The grooves and the coating together define one or more channels for cooling the component. Methods for fabricating and coating a component are also provided.

11 Claims, 5 Drawing Sheets

(56) References Cited

U.S. PATENT DOCUMENTS

| | | | |
|---|---|---|---|
| 6,617,003 | B1 | 9/2003 | Lee et al. |
| 6,905,302 | B2 | 6/2005 | Lee et al. |
| 6,921,014 | B2 | 7/2005 | Hasz et al. |
| 7,014,923 | B2 | 3/2006 | Schnell et al. |
| 7,094,475 | B2 | 8/2006 | Schnell et al. |
| 7,186,167 | B2 | 3/2007 | Joslin |
| 7,302,990 | B2 | 12/2007 | Bunker et al. |
| 7,744,348 | B2 | 6/2010 | Bezencon et al. |
| 2001/0001680 | A1* | 5/2001 | Farmer et al. ............ 427/348 |
| 2002/0141872 | A1* | 10/2002 | Darolia et al. ............ 416/241 R |
| 2010/0080688 | A1 | 4/2010 | Bezencon et al. |

OTHER PUBLICATIONS

B. Wei et al., "Curved Electrode and Electrochemical Machining Method and Assembly Employing the Same," U.S. Appl. No. 12/562,568, filed Sep. 18, 2009.

W. Zhang et al., Process and System for Forming Shaped Air Holes, U.S. Appl. No. 12/697,005, filed Jan. 29, 2010.

B. P. Lacy et al., "Hot Gas Path Component Cooling System," U.S. Appl. No. 12/765,372, filed Apr. 22, 2010.

B. Lacy et al., "Articles Which Include Chevron Film Cooling Holes, and Related Processes," U.S. Appl. No. 12/690,675, filed May 28, 2010.

J. E. J. Lambie et al., "An overview on micro-meso manufacturing techniques for micro-heat exchangers for turbine blade cooling," International Journal Manufacturing research, vol. 3, No. 1, 2008, pp. 3-26.

B.P. Lacy et al., "Hot Gas Path Component Cooling System," U.S. Appl. No. 12/765,372, filed Apr. 22, 2010.

R.S. Bunker et al., "Turbine Components With Cooling Features and Methods of Manufacturing the Same," U.S. Appl. No. 12/953,177, filed Nov. 23, 2010.

\* cited by examiner

METHODS OF FABRICATING AND COATING A COMPONENT

BACKGROUND

The invention relates generally to gas turbine engines, and, more specifically, to microchannel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Microchannel cooling has the potential to significantly reduce cooling requirements by placing the cooling as close as possible to the heat zone, thus reducing the temperature difference between the hot side and cold side for a given heat transfer rate. However, current techniques for forming microchannels typically require the use of a sacrificial filler to keep the coating from being deposited within the microchannels, to support the coating during deposition, as well as the removal of the sacrificial filler after deposition of the coating system. However, both the filling of the channels with a fugitive material, and the later removal of that material present potential problems for current microchannel processing techniques. For example, the filler must be compatible with the substrate and coatings, yet have minimal shrinkage, but also have sufficient strength. Removal of the sacrificial filler involves potentially damaging processes of leaching, etching, or vaporization, and typically requires long times. Residual filler material is also a concern.

It would therefore be desirable to provide a method for depositing coatings on hot gas path components with grooves to form cooling channels therein that eliminates the need for the filling and removal processes. In addition, it would be desirable to provide a method for depositing coatings on hot gas path components that reduces the amount of coating deposited on the interior or exposed wall surfaces of the channels when deposited without the use of a sacrificial filler.

BRIEF DESCRIPTION

One aspect of the present invention resides in a method of coating a component comprising a substrate, where one or more grooves are formed in and extend at least partially along a surface of the substrate. The method comprises depositing a coating over at least a portion of the surface of the substrate, where the coating comprises one or more layers. At least one of the layers is deposited at one or more angles including an angle $\alpha$, where $\alpha$ is in a range of about 10-85 degrees relative to a surface normal of the substrate. The one or more grooves and the coating together define one or more channels for cooling the component.

Another aspect of the invention resides in a component comprising a substrate comprising an outer surface and an inner surface, where the inner surface defines at least one hollow, interior space, where the outer surface defines one or more grooves, and where each of the one or more grooves extends at least partially along the surface of the substrate and has a base. One or more access holes extend through the base of a respective one of the one or more grooves to place the groove in fluid communication with respective ones of the at least one hollow interior space. The component further includes a coating disposed over at least a portion of the surface of the substrate. The coating comprises one or more layers, and at least one of the layers defines one or more permeable slots, such that the respective layer does not completely bridge each of the one or more grooves. The grooves and the coating together define one or more channels for cooling the component.

Yet another aspect of the invention resides in a method of fabricating a component. The method includes forming one or more grooves in a surface of a substrate, where the substrate has at least one hollow interior space. Each of the one or more grooves extends at least partially along the substrate surface and has a base. The method further includes forming one or more access holes through the base of a respective one of the one or more grooves, to connect the groove in fluid communication with respective ones of the at least one hollow interior space. The method further includes depositing a coating over at least a portion of the surface of the substrate, such that the one or more grooves and the coating together define one or more channels for cooling the component. The one or more grooves are unfilled when the coating is deposited over the one or more grooves.

DRAWINGS

These and other features, aspects, and advantages of the present invention will become better understood when the following detailed description is read with reference to the accompanying drawings in which like characters represent like parts throughout the drawings, wherein.

Figure 8:
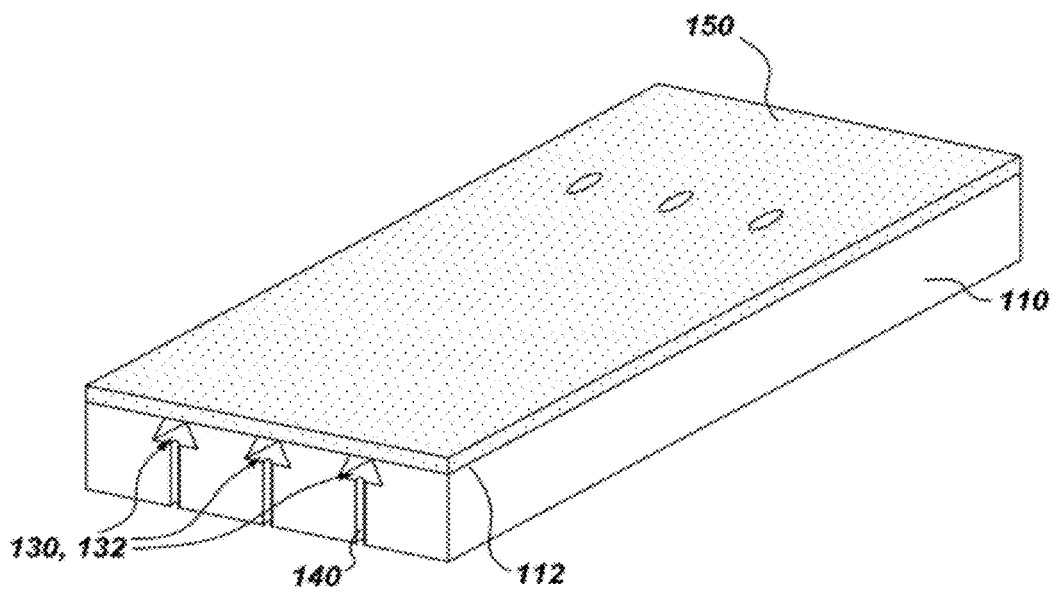
Figure 9:
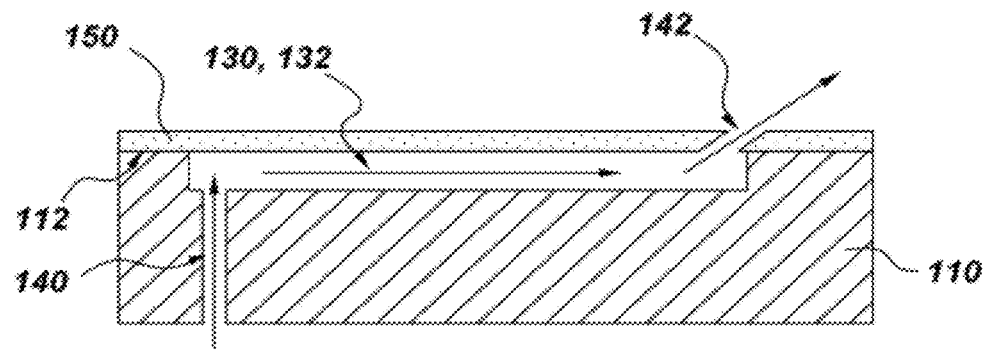
Figure 10:
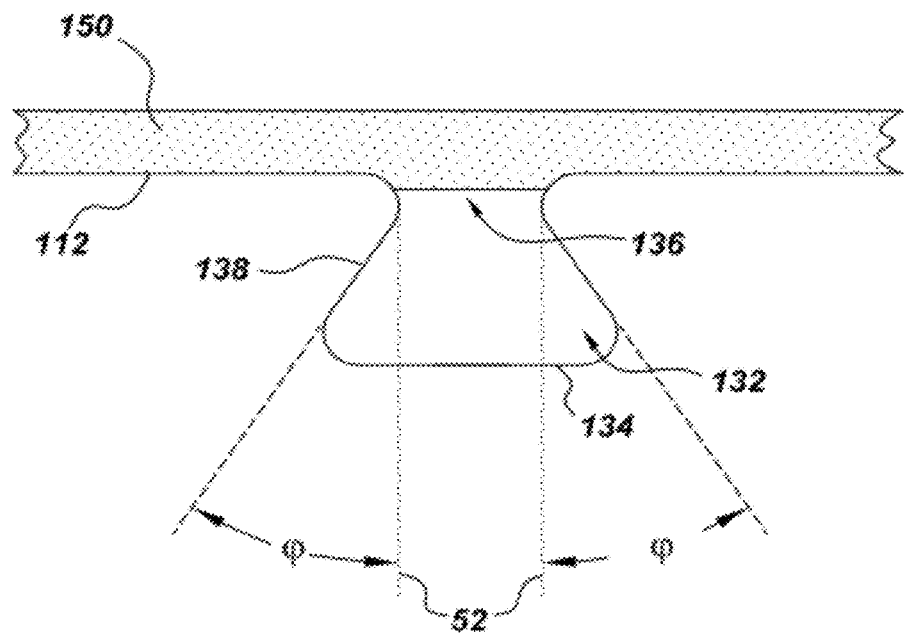

FIG. 8 schematically depicts, in perspective view, three example microchannels that extend partially along the surface of the substrate and channel coolant to respective film cooling holes;

FIG. 9 is a cross-sectional view of one of the example microchannels of FIG. 8 and shows the microchannel conveying coolant from an access hole to a film cooling hole; and FIG. 10 schematically depicts, in cross-section, a re-entrant shaped groove with a coating extending over the top of the groove to form a re-entrant shaped channel.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
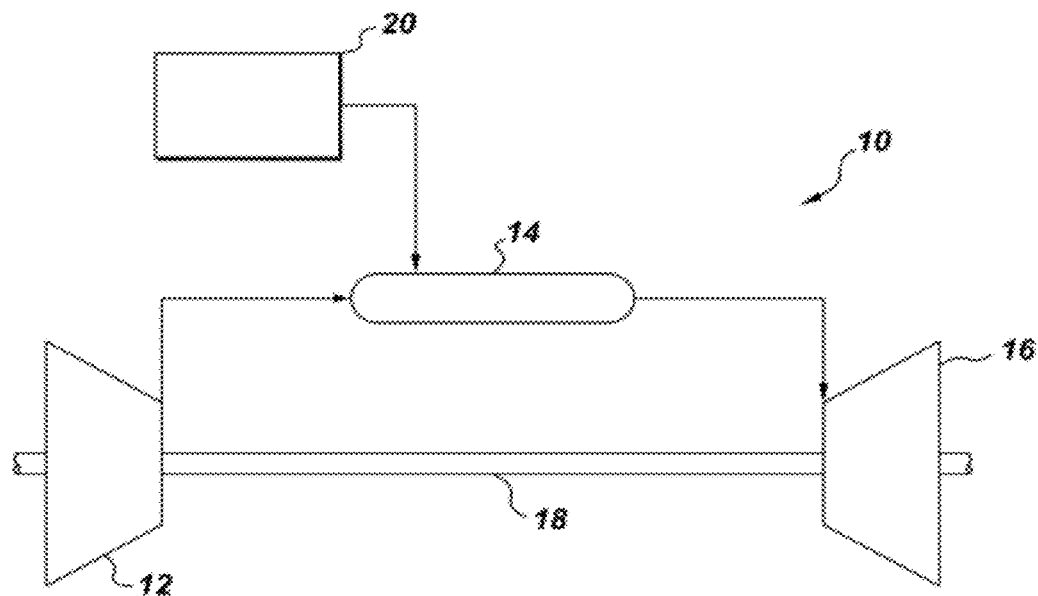
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or microchannels, formed in the surface of the hot gas path component 100. The hot gas path component may be provided with a coating. A cooling fluid may be provided to the channels from a plenum, and the cooling fluid may flow through the channels, cooling the coating.

A method of coating a component 100 is described with reference to FIGS. 2-9. As indicated for example in FIGS. 3, 4 and 7, the method includes forming one or more grooves 132 in a substrate 110. For the illustrated examples, multiple grooves 132 are formed in the substrate 110. As indicated, for example in FIGS. 8 and 9, the grooves 132 extend at least partially along a surface 112 of the substrate 110. As indicated for example in FIGS. 3 and 4, the method further includes depositing a coating 150 over at least a portion of the surface 112 of the substrate 110. More particularly, the coating 150 is deposited over at least a portion of the surface 112 of the substrate 110 directly over open (unfilled) ones of the grooves 132. As used here, "open" means that the grooves 132 are empty, i.e. they are not filled with a sacrificial filler. However, for an alternate process configuration, which is described below, a sacrificial filler is used.

Figure 3:
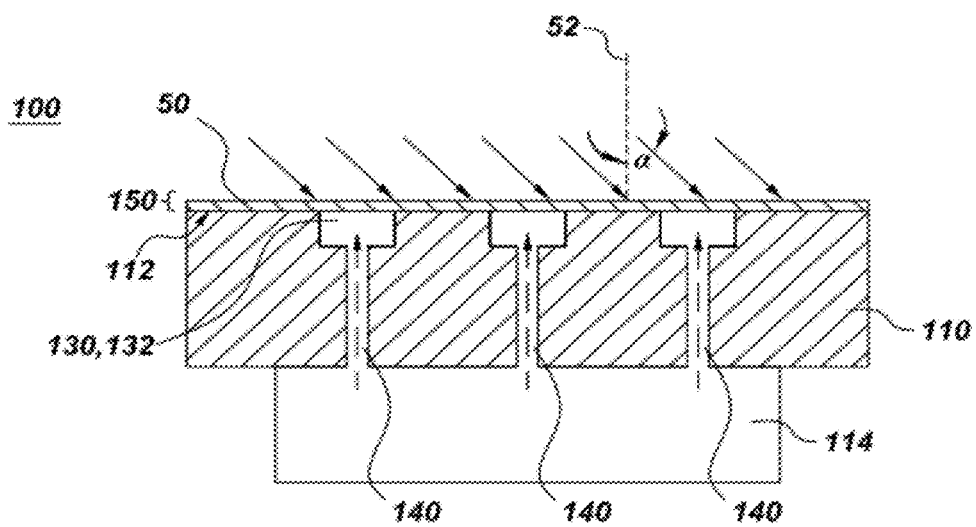
FIG. 3 is a schematic cross-section of a portion of a cooling circuit with cooling channels formed in a substrate and a coating layer disposed on the substrate with a microstructure oriented at an angle α relative to the surface normal for the substrate.
Figure 4:
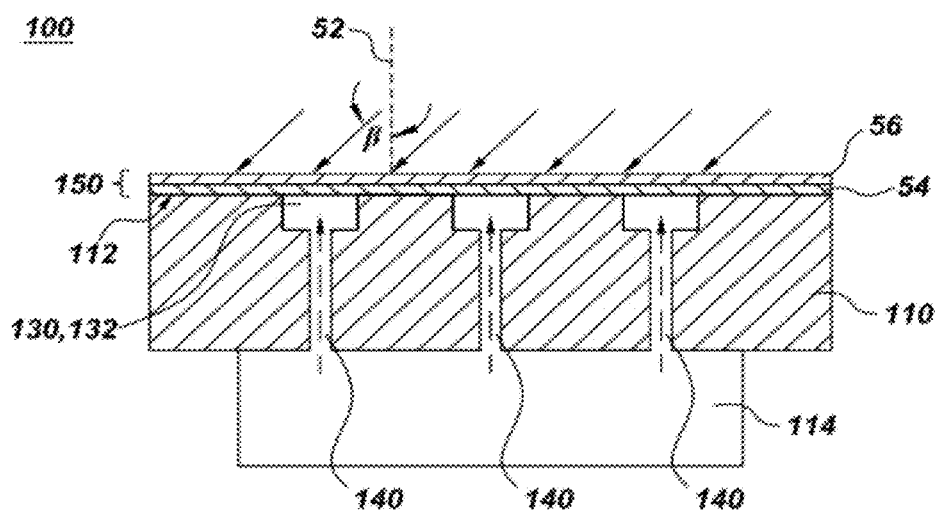
FIG. 4 is a schematic cross-section of a portion of a cooling circuit with cooling channels formed in a substrate and first and second coating layers stacked on the substrate with respective microstructures oriented at angles α and β relative to the surface normal for the substrate.

Example coatings 150 are provided in U.S. Pat. Nos. 5,640, 767 and 5,626,462, which are incorporated by reference herein in their entirety. As discussed in U.S. Pat. No. 5,626, 426, the coatings 150 are bonded to portions of the surface 112 of the substrate 110. The coating 150 comprises one or more layers 50. For the example arrangement shown in FIG. 3, at least one of the layers 50 is deposited at an angle α in a range of about 20-85 degrees relative to a surface normal 52 of the substrate 110. More particularly, the illustrated deposition angle α is in a range of about 45-80 degrees, and still more particularly, in a range of about 50-70 degrees relative to the surface normal 52 of the substrate 110. More generally, at least one of the layers (50) is deposited at one or more angles. As drawn in FIG. 3, the angle α and similarly, the angle β in FIG. 4, are defined relative to the surface normal 52 of the substrate 110. FIGS. 3 and 4 show the grooves 132 as perpendicular to the plane of the pages, i.e. as a cross section transverse to the groove direction. However, grooves with differing orientations may also be formed in the substrate 110, and for such grooves, it is not possible to micro-coat, such that the coating deposition angles are always transverse to the groove direction, but rather the coating angle will be, in effect, a compound angle, having the defined angle α or β to surface normal, but also an angle (not shown) relative to the local groove direction.

As shown in FIGS. 3, 4, 8 and 9, for example, the grooves 132 and the coating 150 together define a number of channels 130 for cooling the component 100. Although the grooves 132 and channels 130 are shown as being rectangular in FIGS. 3, 4, 8 and 9, they may also take on other shapes. For example, the grooves 132 (and channels 130) may be re-entrant grooves 132 (re-entrant channels 130), as described below with reference to FIGS. 7 and 10. In addition, the side-walls of the grooves 132 (channels 130) need not be straight. For various applications, the side-walls of the grooves 132 (channels 130) may be curved or rounded.

The substrate 110 is typically cast prior to forming the grooves 132 in the surface 112 of the substrate 110. As discussed in commonly assigned U.S. Pat. No. 5,626,462, which is incorporated by reference herein in its entirety, substrate 110 may be formed from any suitable material, described herein as a first material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. First material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, such as Nb/Ti alloys, and particularly those alloys comprising Nb-(27-40)Ti-(4.5-10.5)Al-(4.5-7.9)Cr-(1.5-5.5) Hf-(0-6)V in an atom percent. First material may also comprise a Nb-base alloy that contains at least one secondary phase, such as an Nb-containing intermetallic compound, a Nb-containing carbide or a Nb-containing boride. Such alloys are analogous to a composite material in that they contain a ductile phase (i.e. the Nb-base alloy) and a strengthening phase (i.e. a Nb-containing intermetallic compound, a Nb containing carbide or a Nb-containing boride).

Figure 2:
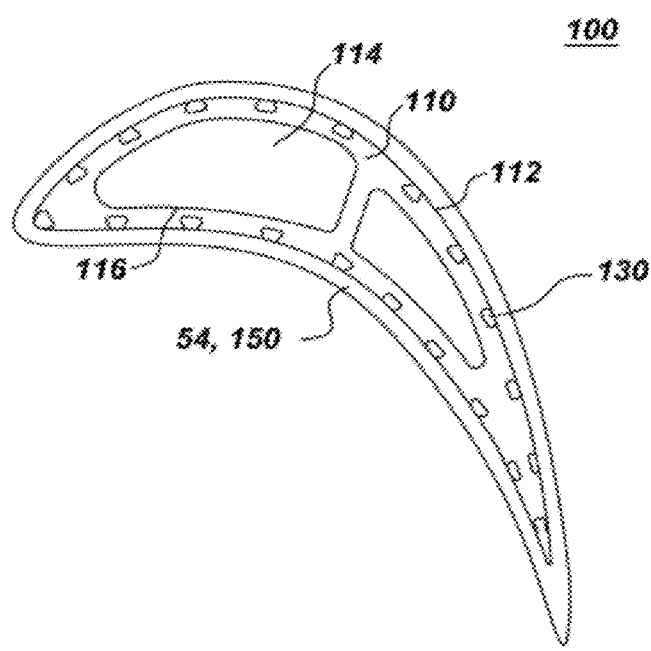
FIG. 2 is a schematic cross-section of an example airfoil configuration with a coating layer with a microstructure oriented at an angle $\alpha$ relative to the surface normal for the substrate, in accordance with aspects of the present invention.

For the example arrangement illustrated in FIGS. 2, 8 and 9, coating 150 extends longitudinally along airfoil-shaped outer surface 112 of substrate 110. Coating 150 conforms to airfoil-shaped outer surface 112 and covers grooves 132 forming microchannels 130. As indicated in FIGS. 8 and 9, for example, the substrate 110 and coating 150 may further define a plurality of exit film holes 142. For the example configuration shown in FIG. 9, the micro-channel 130 conveys coolant from an access hole 140 to a film cooling hole 142. It should be noted that as depicted, coating 150 is just the first coating or structural coating that covers the channels. For certain applications, a single coating may be all that is used. However, for other applications, a bondcoat and a thermal barrier coating (TBC) are also used. For the example arrangements illustrated in FIGS. 8 and 9, the microchannels 130 channel the cooling flow from the respective access hole 140 to the exiting film hole 142. For the examples shown in FIGS. 8 and 9, the grooves convey fluid to exiting film holes 142. However, other configurations do not entail a film hole, with the micro-channels simply extending along the substrate surface 112 and exiting off an edge of the component, such as the trailing edge or the bucket tip, or an endwall edge. In addition, it should be noted that although the film holes are shown in FIG. 8 as being round, this is simply a non-limiting example. The film holes may also be non-circular shaped holes.

Typically, the microchannel length is in the range of 10 to 1000 times the film hole diameter, and more particularly, in the range of 20 to 100 times the film hole diameter. Beneficially, the microchannels 130 can be used anywhere on the surfaces of the components (airfoil body, lead edges, trail edges, blade tips, endwalls, platforms). In addition, although the microchannels are shown as having straight walls, the channels 130 can have any configuration, for example, they may be straight, curved, or have multiple curves, etc. Coating 150 comprises a second material, which may be any suitable material and is bonded to the airfoil-shaped outer surface 120 of substrate 110. For particular configurations, the coating 150 has a thickness in the range of 0.1-2.0 millimeters, and more particularly, in the range of 0.1 to 1 millimeters, and still more particularly 0.1 to 0.5 millimeters for industrial components. For aviation components, this range is typically 0.1 to 0.25 millimeters. However, other thicknesses may be utilised depending on the requirements for a particular component 100.

For the example configuration shown in FIG. 4, the coating 150 comprises two layers 54, 56. Although only two coating layers 54 and 56 are shown in FIG. 4, additional coating layers 50 may be applied for certain applications. For the example arrangement shown in FIG. 4, the first one 54 of the layers 50 is deposited on the substrate 110 at an angle α, and the second one 56 of the layers 50 is deposited over the first layer 56 at an angle β. For certain process configurations, the angle β may be substantially the same as the angle α (namely β=α+/−10°, such that the orientation of the first 54 and second 56 layers are substantially mirror opposites. For other process configurations, the deposition angles β and α may differ more substantially. For example, the second 56 layer may be deposited at an angle β that is closer to the surface normal 52 than is the deposition angle α for the first 54 layer. By alternating or modulating the coating deposition angle from side to side such that the first coating layer 54 is applied at one angle α and the second coating layer 56 is applied at the opposing angle β=180−α, a coating microstructure is built up that can close off regions left open by a single direction coating, as is evident from a comparison of FIGS. 5 and 6. This alternation can proceed for two layers or for additional layers.

Figure 5:
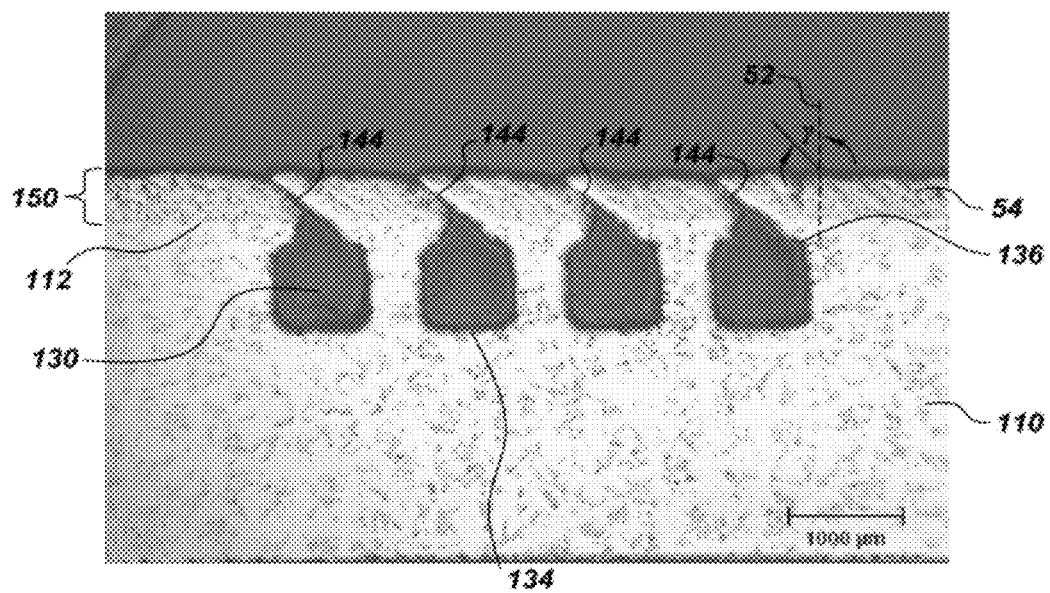
FIG. 5 shows four example cooling channels formed in a nickel alloy substrate with a nickel alloy first coating layer deposited at an angle α of about 45 degrees relative to the surface normal for the substrate.
Figure 6:
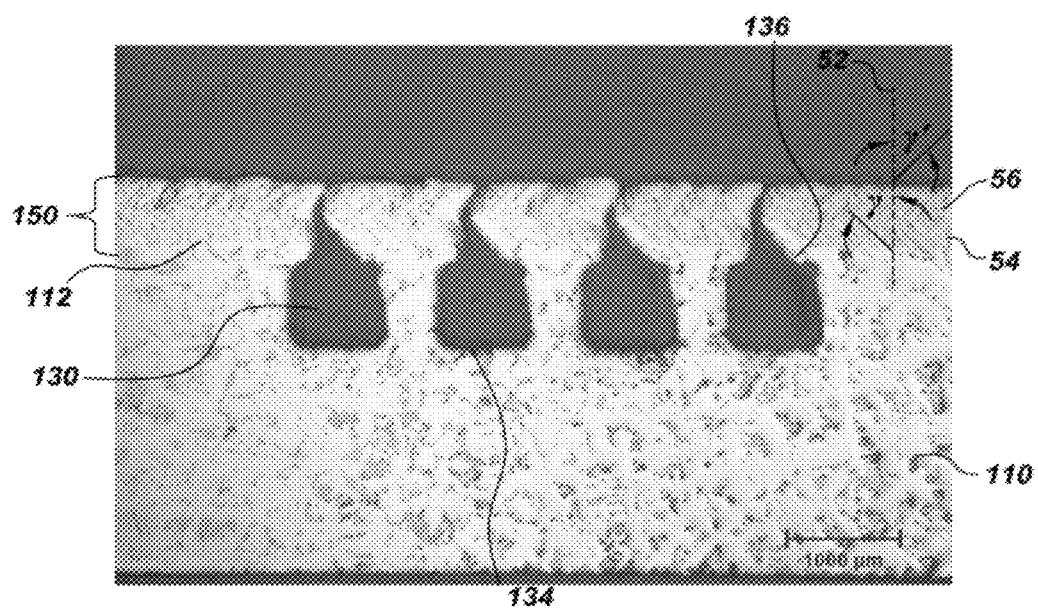
FIG. 6 shows the four example cooling channels of FIG. 5 with an additional second nickel alloy coating layer deposited at an angle β of about 45 degrees relative to the surface normal for the substrate.

For the example configurations depicted in FIG. 4, the first and second coating layers 54, 56 completely bridge the respective grooves 132, such that the coating (150) seals the respective microchannels 130. However, for other configurations, the first layer 54 defines one or more permeable slots 144, such that the first layer 54 does not completely bridge each of the respective grooves 132. Example porous layers 54, 56 are shown in FIGS. 5 and 6. FIG. 5 shows four example cooling channels formed in a GTD444® substrate with a Rene 142C® first coating layer 54 deposited at an angle α of about 45 degrees relative to the surface normal 52 of the substrate 110. FIG. 6 shows the four example cooling channels of FIG. 5 with an additional second Rene 142C® coating layer 56 deposited at an angle β of about 45 degrees relative to the surface normal 52 of the substrate 110. For more particular configurations, the second layer 56 also defines one or more permeable slots 144, such that the first and second layers 54, 56 do not completely bridge each of the respective grooves 132. As indicated in FIG. 5, typically gap (permeable slot) 144 has an irregular geometry, with the width of the gap 144 varying, as the coating 150 is applied and builds up a thickness. Initially, as the first part of the coating 54 is applied to the substrate 110, the width of the gap 144 may be as much as 50% of the width of the top 136 of the micro-channel 130.

The gap 144 may then narrow down to 5% or less of the width of the top 136, as the coating 150 is built up. For particular examples, the width of gap 144, at its narrowest point, is 5% to 20% of the width of the respective micro-channel top 136. In addition, the permeable slot 144 may be porous, in which case the "porous" gap 144 may have some connections, that is, some spots or localities that have zero gap. Beneficially, the gaps 144 provide stress relief for the coating 150.

However, while it is important to have the stress relief provided by the gap 144 in the first coating 54, the resulting gap 144 in the first coating layer 54 is much smaller than the original opening 136. Thus, there is less need for a gap in the second coating layer 56. Thus, although not expressly shown, for certain configurations, there is a permeable slot 144 in the first coating layer 54 and a continuous (no gap) second coating layer 56. This particular configuration can be achieved, for example, by rotating the substrate 110 about one or more axes during deposition of the second coating layer 56 or by otherwise depositing the second coating layer 56 approximately normal to the substrate 110 or more generally, at an angle β in a range of about +/−20 degrees relative to the surface normal 52 of the substrate 110, in order to completely coat over the permeable slot 144 formed in the first coating layer 54. Another technique for producing this specific configuration (namely, a gap 144 in the first coating layer 54 with a continuous second coating layer 56) would be to apply an alternate type of second coating, such as an air plasma spray coating. In addition, applying a thicker second coating layer 56 will also eventually close the gap 144. More generally, a permeable slot 144 may be formed in one or more coating layers 50 with a subsequently deposited layer bridging the slots, thereby effectively sealing the slots 144. Thus, depending on their specific function, the permeable slots 144, may extend either (1) through all of the coating layers or (2) merely through some coatings but not all coatings. Beneficially, the permeable slot 144 functions as a stress/strain relief for the structural coating(s). In addition, the permeable slot 144 can serve as a cooling means when it extends through all coatings, that is for this configuration, the permeable slots 144 are configured to convey a coolant fluid from the respective channels 130 to an exterior surface of the component. Further, the permeable slot 144 serve as a passive cooling means when bridged by the upper coatings, in the case when those coatings are damaged or spalled.

Figure 7:
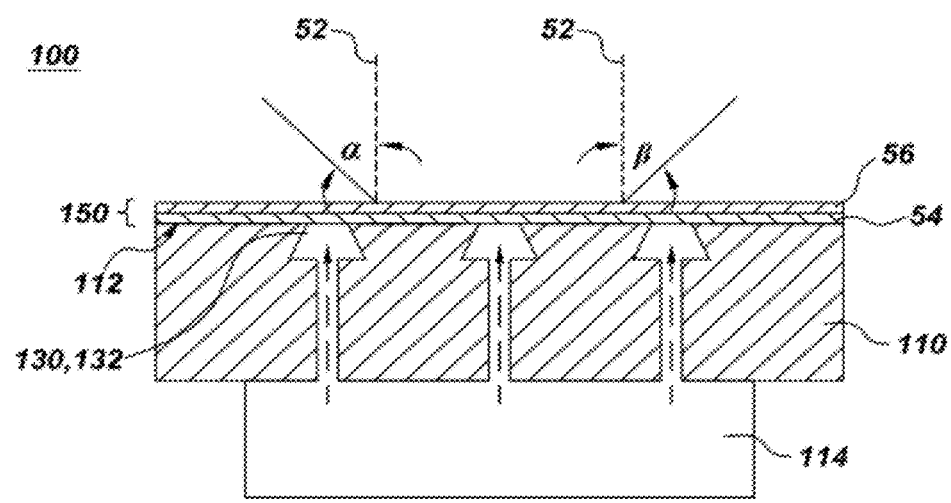
FIG. 7 is a schematic cross-section of a portion of a cooling circuit with re-entrant cooling channels and first and second coating layers stacked on the substrate with respective microstructures oriented at angles α and β relative to the surface normal for the substrate.

For the example configuration shown in FIG. 7, each of the grooves 132 has a base 134 and a top 136, where the base 134 is wider than the top 136, such that each of the grooves 132 comprises a re-entrant shaped groove 132. For particular configurations, the base 134 of a respective one of the re-entrant shaped grooves 132 is at least 2 times wider than the top 136 of the respective groove 132. For more particular configurations, the base 134 of the respective re-entrant shaped groove 132 is at least 3 times, and more particularly, is in a range of about 3-4 times wider than the top 136 of the respective groove 132. Beneficially, the above described angled coating deposition can be used in combination with the re-entrant grooves 132 provided in commonly assigned, concurrently filed, US Patent Application, Ronald S. Bunker et al., "Components with re-entrant shaped cooling channels and methods of manufacture," corresponding to GE docket number 246424-1, which is incorporated by reference herein in its entirety. Beneficially, by applying the coating at a significant deposition angle, the coating 150 can bridge over the re-entrant groove 132 without filling or partial filling. In addition, the re-entrant grooves provide enhanced cooling relative to a simple shaped groove (namely, grooves with tops 136 and bases of approximately equal width) with the same width at the top 136.

The coating 150 may be deposited using a variety of techniques. For particular processes, the coating 150 is disposed over at least a portion of the surface 112 of the substrate 110 by performing an ion plasma deposition. Example cathodic arc ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in erosion or evaporation of coating material from the cathode surface, and depositing the coating material from the cathode upon the substrate surface 112.

In one non-limiting example, the ion plasma deposition process comprises a plasma vapor deposition process. Non-limiting examples of the coating 150 include structural coatings, bond coatings, oxidation-resistant coatings, and thermal barrier coatings, as discussed in greater detail below with reference to U.S. Pat. No. 5,626,462. For certain hot gas path components 100, the coating 150 comprises nickel-based or cobalt-based alloy, and more particularly comprises a superalloy or a NiCoCrAlY alloy. For example, where the first material of substrate 110 is a Ni-base superalloy containing both γ and γ' phases, coating 150 may comprise these same materials, as discussed in greater detail below with reference to U.S. Pat. No. 5,626,462.

For other process configurations, the coating 150 is disposed over at least a portion of the surface 112 of the substrate 110 by performing at least one of a thermal spray process and a cold spray process. Briefly, cold spray is a non-thermal spray process, in which metal powder is accelerated in inert gas jets. Upon impact with the substrate, the metal particles undergo plastic deformation to adhere to the substrate surface. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also know as vacuum plasma spray or VPS). In one non-limiting example, a NiCrAlY coating is deposited by HVOF or HVAF. Other example techniques for depositing one or more layers of the coating 150 include, without limitation, sputtering, electron beam physical vapor deposition, electroless plating, and electroplating.

For certain configurations, it is desirable to employ multiple deposition techniques for forming the coating system 150. For example, the first layer 54 may be deposited using an ion plasma deposition, and the second layer 56 and optional additional layers (not shown) may be deposited using other techniques, such as a combustion spray process (for example HVOF or HVAF) or using a plasma spray process, such as LPPS. Depending on the materials used, the use of different deposition techniques for the coating layers 50 may provide benefits in strain tolerance and/or in ductility.

More generally, and as discussed in U.S. Pat. No. 5,626,462, the second material used to form coating 150 comprises any suitable material. For the case of a cooled turbine component 100, the second material must be capable of withstanding temperatures of about 1150° C., while the TBC can go to about 1320° C. The coating 150 must be compatible with and adapted to be bonded to the airfoil-shaped outer surface 112 of substrate 110. This bond may be formed when the coating 150 is deposited onto substrate 110. Bonding may be influenced during the deposition by many parameters, including the method of deposition, the temperature of the substrate 110 during the deposition, whether the deposition surface is biased relative to the deposition source, and other parameters. Bonding may also be affected by subsequent heat treatment or other processing. In addition, the surface morphology, chemistry and cleanliness of substrate 110 prior to the deposition can influence the degree to which metallurgical bonding occurs. In addition to forming a strong metallurgical bond between coating 150 and substrate 110, it is desirable that this bond remain stable over time and at high temperatures with respect to phase changes and interdiffusion, as described herein. By compatible, it is preferred that the bond between these elements be thermodynamically stable such that the strength and ductility of the bond do not deteriorate significantly over time (e.g. up to 3 years) by interdiffusion or other processes, even for exposures at high temperatures on the order of 1,150° C., for Ni-base alloy airfoil support walls 40 and Ni-base airfoil skins 42, or higher temperatures on the order of 1,300° C. in the case where higher temperature materials are utilized, such as Nb-base alloys.

As discussed in U.S. Pat. No. 5,626,462, where the first material of substrate 110 is an Ni-base superalloy containing both $\gamma$ and $\gamma'$ phases or a NiAl intermetallic alloy, second materials for coating 150 may comprise these same materials. Such a combination of coating 150 and substrate 110 materials is preferred for applications such as where the maximum temperatures of the operating environment similar to those of existing engines (e.g. below 1650° C.). In the case where the first material of substrate 110 is an Nb-base alloys, second materials for coating 150 may also comprise an Nb-base alloy, including the same Nb-base alloy.

As discussed in U.S. Pat. No. 5,626,462, for other applications, such as applications that impose temperature, environmental or other constraints that make the use of a metal alloy coating 150 undesirable, it is preferred that coating 150 comprise materials that have properties that are superior to those of metal alloys alone, such as composites in the general form of intermetallic compound ($I_s$)/metal alloy (M) phase composites and intermetallic compound ($I_s$)/intermetallic compound ($I_M$) phase composites. Metal alloy M may be the same alloy as used for airfoil support wall 40, or a different material, depending on the requirements of the airfoil. These composites are generally speaking similar, in that they combine a relatively more ductile phase M or $I_M$ with a relatively less ductile phase $I_s$, in order to create a coating 150 that gains the advantage of both materials. Further, in order to have a successful composite, the two materials must be compatible. As used herein in regard to composites, the term compatible means that the materials must be capable of forming the desired initial distribution of their phases, and of maintaining that distribution for extended periods of time as described above at use temperatures of 1,150° C. or more, without undergoing metallurgical reactions that substantially impair the strength, ductility, toughness, and other important properties of the composite. Such compatibility can also be expressed in terms of phase stability. That is, the separate phases of the composite must have a stability during operation at temperature over extended periods of time so that these phases remain separate and distinct, retaining their separate identities and properties and do not become a single phase or a plurality of different phases due to interdiffusion. Compatibility can also be expressed in terms of morphological stability of the interphase boundary interface between the $I_s$/M or $I_s/_M$ composite layers. Such instability may be manifested by convolutions, which disrupt the continuity of either layer. It is also noted that within a given coating 150, a plurality of $I_{sS}$/M or $I_s/_M$ composites may also be used, and such composites are not limited to two material or two phase combinations. The use of such combinations are merely illustrative, and not exhaustive or limiting of the potential combinations. Thus $M/I_M/I_S$, $M/I_{S1}/I_{S2}$ (where $I_{S1}$ and $I_{S2}$ are different materials) and many other combinations are possible.

As discussed in U.S. Pat. No. 5,626,462, where substrate 110 comprises a Ni-base superalloy comprising a mixture of both $\gamma$ and $\gamma'$ phases, $I_S$ may comprise $Ni_3$ [Ti, Ta, Nb, V], NiAl, $Cr_3$ Si, $[Cr, Mo]_x$ Si, [Ta, Ti, Nb, Hf, Zr, V]C, $Cr_3 C_2$ and $Cr_7 C_3$ intermetallic compounds and intermediate phases and M may comprise a Ni-base superalloy comprising a mixture of both $\gamma$ and $\gamma'$ phases. In Ni-base superalloys comprising a mixture of both $\gamma$ and $\gamma'$ phases, the elements Co, Cr, Al, C and B are nearly always present as alloying constituents, as well as varying combinations of Ti, Ta, Nb, V, W, Mo, Re, Hf and Zr. Thus, the constituents of the exemplary $I_S$ materials described correspond to one or more materials typically found in Ni-base superalloys as may be used as first material (to form the substrate 110), and thus may be adapted to achieve the phase and interdiffusional stability described herein. As an additional example in the case where the first material (the substrate 110) comprises NiAl intermetallic alloy, $I_S$ may comprise $Ni_3$ [Ti, Ta, Nb, V], NiAl, $Cr_3$ Si, $[Cr, Mo]_x$ Si, [Ta, Ti, Nb, Hf, Zr, V]C, $Cr_3 C_2$ and $Cr_7 C_3$ intermetallic compounds and intermediate phases and $L_A$ may comprise a $Ni_3$ Al intermetallic alloy. Again, in NiAl intermetallic alloys, one or more of the elements Co, Cr, C and B are nearly always present as alloying constituents, as well as varying combinations of Ti, Ta, Nb, V, W, Mo, Re, Hf and Zr. Thus, the constituents of the exemplary $I_S$ materials described correspond to one or more materials typically found in NiAl alloys as may be used as first material, and thus may be adapted to achieve the phase and interdiffusional stability described herein.

As discussed in U.S. Pat. No. 5,626,462, where substrate 110 comprises a Nb-base alloy, including a Nb-base alloy containing at least one secondary phase, $I_S$ may comprise a Nb-containing intermetallic compound, a Nb-containing carbide or a Nb-containing boride, and M may comprise a Nb-base alloy. It is preferred that such $I_S$/M composite comprises an M phase of an Nb-base alloy containing Ti such that the atomic ratio of the Ti to Nb (Ti/Nb) of the alloy is in the range of 0.2-1, and an $I_S$ phase comprising a group consisting of Nb-base silicides, $Cr_2$ [Nb, Ti, Hf], and Nb-base aluminides, and wherein Nb, among Nb, Ti and Hf, is the primary constituent of $Cr_2$ [Nb, Ti, Hf] on an atomic basis. These compounds all have Nb as a common constituent, and thus may be adapted to achieve the phase and interdiffusional stability described in U.S. Pat. No. 5,626,462.

The as-applied coating has sufficient particle size, strength, and adhesion (bonding) to bridge the opening gaps 136 of the grooves 132, without the use of a sacrificial filler during the coating deposition, and with minimal amounts of coating material being deposited inside the groove. However, typically, some coating material will also fill-in the opening slightly below the outer surface, as indicated in FIG. 10, for example. This bridging effect has been documented previously with plasma vapor deposition (PVD) TBC coatings deposited over small sized open grooves. Beneficially, use of the present angled deposition technique, with thermal spray coatings results in much larger particle agglomerations with the ability to bridge larger gap 136 sizes.

Referring now to FIGS. 3 and 4, for certain configurations, the coating 150 completely bridges the respective grooves 132, such that the coating 150 seals the respective micro-channels 130. More particularly, for the example arrangements shown in FIGS. 4 and 7, the first and second coating layers 54, 56 completely bridge the respective grooves 132. For other configurations, the coating 150 defines one or more permeable slots 144, such that the coating 150 does not completely bridge each of the respective grooves 132, as shown for example in FIGS. 5 and 6. This porous configuration provides stress relief for the coating 150.

Beneficially, by depositing the coating 150 at an angle $\alpha$, $\beta$, it is not necessary to use a sacrificial filler (not shown) to apply coating 150 to the substrates 110. This eliminates the need for a filling process and for the more difficult removal process. Further, performing an angled coating deposition on re-entrant shaped grooves with narrow openings 136 (tops), for example with openings 136 in the range of about 10-12 mils wide, the openings 136 can be bridged by the coating 150 without the use of a sacrificial filler, thereby eliminating two of the main processing steps (filling and leaching) for conventional channel forming techniques.

In addition to coating 150, the interior surface of the groove 132 (or of the micro-channel 130, if the first (inner) layer of coating 150 is not particularly oxidation-resistant) can be further modified to improve its oxidation and/or hot corrosion resistance. Suitable techniques for applying an oxidation-resistant coating (not expressly shown) to the interior surface of the grooves 132 (or of the micro-channels 130) include vapor-phase or slurry chromiding, vapor-phase or slurry aluminizing, or overlay deposition via evaporation, sputtering, ion plasma deposition, thermal spray, and/or cold spray. Example oxidation-resistant overlay coatings include materials in the MCrAlY family (M={Ni,Co,Fe}) as well as materials selected from the NiAlX family (X={Cr,Hf,Zr,Y,La,Si,Pt,Pd}).

However, for certain process configurations fillers and subsequent leaching processes may be employed. For these process configurations, the method further includes filling the grooves 132 with a filler (not shown) prior to depositing the coating 150. For example, the filler may be applied by slurry, dip coating or spray coating the component 100 with a metallic slurry "ink" (not shown) such that the grooves 132 are filled. For other configurations, the filler may be applied using a micro-pen or syringe. For certain implementations, the grooves 132 may be over-filled with the filler material. Excess filler may be removed, for example may be wiped off, such that the grooves 132 are "seen." Non-limiting example materials for the filler include UV curable resins, ceramics, copper or molybdenum inks with an organic solvent carrier, and graphite powder with a water base and a carrier. More generally, the filler may comprise the particles of interest suspended in a carrier with an optional binder. Further, depending on the type of filler employed, the filler may or may not flow into the access holes 140. Example filler materials (or channel filling means or sacrificial materials) are discussed in commonly assigned, U.S. Pat. No. 5,640,767 and in commonly assigned, U.S. Pat. No. 6,321,449, which are incorporated by reference herein in their entirety. For this process configuration, the method further includes removing the filler from the grooves 132 after depositing the coating 150. For example, the filler may be leached out of the micro-channels 130 using a chemical leaching process. As discussed in U.S. Pat. No. 5,640,767, the filler (or channel filling means) may be removed by melting/extraction, pyrolysis, or etching, for example. Similarly, the filler materials (sacrificial materials) discussed in U.S. Pat. No. 6,321,449 may be removed by disolution in water, an alcohol, acetone, sodium hydroxide, potassium hydroxide or nitric acid.

A component 100 is described with reference to FIGS. 2-10. As indicated, for example, in FIG. 2, the component 100 comprises a substrate 110 with an outer surface 112 and an inner surface 116. As indicated, for example, in FIG. 2, the inner surface 116 defines at least one hollow, interior space 114. As indicated, for example, in FIGS. 2-4, 7 and 8, the outer surface 112 defines one or more grooves 132. For the illustrated examples, the substrate 110 defines multiple grooves. As indicated, for example, in FIGS. 7-9, each of the grooves 132 extends at least partially along the surface 112 of the substrate 110 and has a base 134. To reduce the likelihood of any coating deposition on the interior side-walls of the grooves 13, the channel opening width at the top is desirably in a range of 0.010 to 0.02 inches.

Access holes 140 extend through the respective bases 134 of the grooves 132 to provide fluid communication between the grooves 132 and the hollow interior space(s) 114, as shown for example in FIGS. 3, 4 and 7. The access holes 140 are typically circular or oval in cross-section and may be formed, for example using one or more of laser machining (laser drilling), abrasive liquid jet, electric discharge machining (EDM) and electron beam drilling. The access holes 140 may be normal to the base 134 of the respective grooves 132 (as shown in FIGS. 3, 4 and 7) or, more generally, may be drilled at angles in a range of 20-90 degrees relative to the base 134 of the groove.

As indicated in FIGS. 3, 4 and 7, for example, the component 100 further includes a coating 150 disposed over at least a portion of the surface 112 of the substrate 110, where the coating 150 comprises one or more layers 50. As discussed above, the grooves 132 and the coating 150 together define a number of channels 130 for cooling the component 100. Example coatings are provided above. For example configurations, the coating 150 comprises at least one of a structural coating, a bond coating, an oxidation-resistant coating, and a thermal barrier coating.

For the example arrangements shown in FIGS. 5 and 6, at least one of the coating layers 50 defines one or more permeable slots 144, such that the respective layer 50 does not completely bridge each of the respective grooves 132. As discussed above, for certain arrangements, the permeable slots 144 extend through all of the coating layers, conveying coolant from the channels 130 to an exterior surface of the component. For other configurations, a permeable slot 144 may be formed in one or more coating layers 50 with a subsequently deposited layer bridging the slots, thereby effectively sealing the slots 144. As noted above, the permeable slots 144 provide stress relief for the coating 150. In addition, it should be noted that although one example cross-section for gap 144 is shown in the figures, for other arrangements, the porosity (and hence, cross-section) varies along the length of the micro-channel.

For particular configurations, the gaps 144 are used to deliver cooling flow through the coating(s) 150 to the exterior surface of the component 100. For example, if only structural coatings are applied, then a type of transpiration cooling will result with cooling flows beneficially bled out along the entire channel length. In addition, if only a plasma vapor deposition (PVD) thermal barrier coating (TBC) is applied, then the columnar nature of the TBC would again allow cooling flow to bleed out through the gaps 144. This cooling flow through the permeable slots 144 is particularly beneficial for cooling aviation turbine airfoils.

For the example configuration shown in FIG. 5, each of the permeable slots 144 is inclined at an angle $\gamma$ relative to a surface normal 52 of the substrate 110, where the angle γ is in a range of about 25-70 degrees relative to the surface normal 52 of the substrate 110. The angle of slot inclination γ can be related to a deposition angle α using the following equation:

$$\tan \alpha = 2\tan \gamma \quad \text{(Eq. 1)}$$

For more particular configurations, the angle γ is in a range of about 30-55 degrees relative to the surface normal 52 of the substrate 110. It should be noted, that the configurations shown in FIGS. 5 and 6 would typically result only for components that are stationary during the coating process. In addition, for curved components, the angle γ may vary along the length of the channel 130, as a result of the local curvature of the component. Moreover, for curved components, the angle γ may, vary for different channels based on the local curvature of the component.

For the example configuration shown in FIG. 6, the angle of inclination for the permeable slot 144 varies through the thickness of the coating 150. As shown in FIG. 6, the angle of inclination for the slots 144 γ' (relative to the surface normal 52 of the substrate 110) in the second coating layer 56 differs from the angle of inclination for the slots 144 γ (relative to the surface normal 52) in the first coating layer 54. The angle of slot inclination γ' can be related to a deposition angle β using the following equation:

$$\tan \beta = 2\tan \gamma' \quad \text{(Eq. 2)}$$

For other configurations, the permeable slots 144 are oriented approximately perpendicular to the substrate 110. This configuration will typically result when the substrate 110 is rotated about one or more axes during the deposition of the coating. As used here, the term "approximately" should be understood to mean with +/−15 degrees of the local surface normal.)

For the example configurations shown in FIGS. 5 and 6, the first layer 54 may define one or more permeable slots 144, such that the first layer 54 does not completely bridge each of the respective grooves 132. In addition, for the example arrangement shown in FIG. 6, the second layer 56 also defines one or more permeable slots 144, such that the first and second layers 54, 56 do not completely bridge each of the respective grooves 132.

As discussed above, although the channels 130 are shown as having straight walls, the channels 130 can have any configuration, for example, they may be straight, curved, or have multiple curves, etc. For the example configuration shown in FIGS. 7 and 10, the grooves are re-entrant shaped. Namely, for the arrangements of FIGS. 7 and 10, the base 134 of each of the grooves 132 is wider than the top 136 of the respective groove 132, such that each of the grooves 132 is a re-entrant shaped groove 132. More particularly, the base 134 of the respective re-entrant shaped groove 132 is at least two times wider, and still more particularly, is in a range of about 3-4 times wider than the top 136 of the respective groove 132. For particular configurations, a wall 13 of a respective one of the re-entrant shaped grooves 132 is oriented at an angle φ in a range of about 10-80 degrees relative to a surface normal, as indicated in FIG. 10, for example. More particularly, the wall 138 of the respective one of the re-entrant shaped grooves 132 is oriented at an angle φ in a range of about 10-45 degrees relative to a surface normal.

As noted above, by performing an angled coating deposition on re-entrant shaped grooves with narrow openings 136 (tops), for example with openings 136 in the range of about 10-12 mils wide, the openings 136 can be bridged by the coating 150 without the use of a sacrificial filler, thereby eliminating two of the main processing steps (filling and leaching) for conventional channel forming techniques. In addition the wider base 134 increases the cooling for the channel 130.

A method of fabricating a component 100 is described with reference to FIGS. 2-10. As discussed above with reference to FIGS. 3, 4 and 7, the method includes forming one or more grooves 132 in a surface 112 of a substrate 110. For the illustrated examples, multiple grooves 132 are formed in the substrate surface 112. As indicated, for example, in FIG. 2, the substrate 110 has at least one hollow interior space 114. The substrate 110 is typically cast prior to forming the grooves 132 in the surface 112 of the substrate 110, and example substrate materials are provided above. As discussed above with reference to FIG. 7-9, each of the grooves 132 extends at least partially along the surface 112 of the substrate 110 and has a base 134.

The fabrication method further includes forming a number of access holes 140. More particularly, one or more access holes 140 are provided per groove 132. For the illustrated examples, one access hole 140 is provided per groove 132. As indicated, for example, in FIGS. 3, 4 and 7 each of the access holes 140 is formed through the base 134 of a respective one of the grooves 132, to provide a fluid connection between the groove 132 and the hollow interior space 114. Example access hole geometries and formation methods are provided above.

As indicated in FIG. 3, for example, the fabrication method further includes depositing a coating 150 over at least a portion of the surface 112 of the substrate 110 directly over open (unfilled) grooves 132. As noted above, "open" means that the grooves 132 are empty, i.e. they are not filled with a sacrificial filler. Example coatings are provided above. For example configurations, the coating 150 comprises at least one of a structural coating, a bond coatings, an oxidation-resistant coating, and a thermal barrier coating. The coating 150 may completely bridge the respective grooves 132, such that the coating 150 seals the respective channels 130, as indicated in FIGS. 3, 4 and 7, for example. For other configurations, the coating 150 defines one or more permeable slots 144, such that the coating 150 does not completely bridge each of the respective grooves 132, as shown for example in FIGS. 5 and 6.

For particular configurations, the method further includes rotating the substrate 110 about at least one axis while the coating 150 is being deposited, such that the coating 150 is deposited at a continually varying angle. As used here, the phrase "continually varying" should be understood to be continually varying in time. The substrate may be mounted on a rotating fixture (not shown), such as a single axis rotating fixture or a multi-axis (planetary) rotating fixture. Thus, for a complex part with varying curvature, such as a turbine blade, the angle at which the coating is deposited relative to the surface normal will continually vary in time, such that the resulting permeable slots 144 will be approximately perpendicular to the substrate surface (namely, within +/−15 degrees of the local surface normal).

For the example configuration shown in FIG. 7, the groove base 134 is wider than the top 136 of the groove, such that each of the grooves 132 comprises a re-entrant shaped groove 132. The re-entrant shaped grooves 132 may be formed using one or more of an abrasive liquid jet, plunge electrochemical machining (ECM), electric discharge machining (EDM) with a spinning electrode (milling EDM) and laser machining (laser drilling). Techniques for forming the re-entrant grooves 132 in substrate 110 are provided in Bunker et al. For example, the re-entrant shaped grooves 132 may be formed by directing an abrasive liquid jet (not shown) at a lateral angle relative to the surface 112 of the substrate 110 in a first pass of the abrasive liquid jet, then making a subsequent pass at an angle substantially opposite to that of the lateral angle and optionally performing an additional pass where the abrasive liquid jet is directed toward the base 134 of the groove 132 at one or more angles between the lateral angle and the substantially opposite angle, such that material is removed from the base 134 of the groove 132, as shown in FIGS. 3-5 of Bunker et al. Other tool path configurations for the jet 160 may also be used. For example, the jet 160 may be swept along a radius (FIG. 5) and moved along the channel length direction following a zig-zag tool path In this manner, a relatively narrow groove opening 136 (top of the groove) may be formed. In order to sweep the jet 160, a multi-axis numerically controlled (NC) tool path function may be employed to control the pivot point for the jet 160, to ensure a narrow opening of 136. The depth of the channel is determined by the sweeping speed, as well as the jet travel speed along the channel when the jet pressure is set.

As discussed above, by depositing the coating 150 at an angle $\alpha$, $\beta$, it is not necessary to use a sacrificial filler (not shown) to apply coating 150 to the substrates 110. This eliminates the need for a filling process and for the more difficult removal process. In addition, depositing the coating 150 at an angle $\alpha$, $\beta$, helps to prevent the partial coating of the interior of cooling channels on the component surface.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of coating a component comprising a substrate, wherein one or more grooves are formed in and extend at least partially along a surface of the substrate, the method comprising:
   depositing a coating over at least a portion of the surface of the substrate, wherein each groove has an opening defined at an outer surface of the substrate and wherein the coating comprises one or more layers, wherein at least one of the layers comprises a structural coating having a non-homogenous microstructure and defining one or more permeable slots, such that the structural coating does not completely bridge each of the one or more grooves, and is deposited at one or more angles including an angle $\alpha$ wherein $\alpha$ is in a range of about 10-85 degrees relative to a surface normal of the substrate,
   wherein the step of depositing the coating provides for substantial sealing of the opening of each groove at the outer surface of the substrate, and
   wherein the one or more grooves formed in the substrate and the structural coating together define one or more channels within the substrate for cooling the component.

2. The method of claim 1, wherein the angle $\alpha$ is in a range of about 20-80 degrees relative to the surface normal of the substrate.

3. The method of claim 2, wherein the angle $\alpha$ is in a range of about 45-70 degrees relative to the surface normal of the substrate.

4. The method of claim 1, wherein the coating comprises two or more layers, wherein a first one of the layers comprises the structural coating and defines one or more permeable slots, such that the first layer does not completely bridge each of the one or more grooves.

5. The method of claim 4, wherein a second one of the layers defines one or more permeable slots, such that the first and second layers do not completely bridge each of the one or more grooves.

6. The method of claim 1, wherein each groove narrows at the opening of the groove and thus comprises a re-entrant shaped groove, such that each cooling channel comprises a re-entrant shaped cooling channel.

7. The method of claim 6, wherein a widest point of a respective one of the one or more re-entrant shaped grooves is at least 2 times wider than the opening of the respective groove.

8. The method of claim 1, wherein the structural coating completely bridges the one or more grooves, such that the structural coating seals the respective one or more channels.

9. The method of claim 1, wherein the permeable slots are configured to convey a coolant fluid from the respective one or more channels to an exterior surface of the component.

10. The method of claim 1, wherein the one or more grooves are unfilled when the structural coating is deposited over the one or more grooves.

11. The method of claim 1, further comprising:
   filling the one or more grooves with a filler prior to depositing the structural coating; and
   removing the filler from the one or more grooves after depositing the structural coating.

* * * * *

UNITED STATES PATENT AND TRADEMARK OFFICE
CERTIFICATE OF CORRECTION

PATENT NO.        : 8,673,397 B2
APPLICATION NO.   : 12/943646
DATED             : March 18, 2014
INVENTOR(S)       : Ronald Scott Bunker et al.

It is certified that error appears in the above-identified patent and that said Letters Patent is hereby corrected as shown below:

In the Specification:

In Column 4, Line 59, delete "angle cc" and insert -- angle $\alpha$ --, therefor.

In Column 10, Line 1, delete "$I_S/_M$" and insert -- $I_S/I_M$ --, therefor.

In Column 10, Line 4, delete "$I_{SS}/M$ or $I_S/_M$" and insert -- $I_S/M$ or $I_S/I_M$ --, therefor.

In Column 13, Line 15, delete "angle $\gamma$ may," and insert -- angle $\gamma$ may --, therefor.

Signed and Sealed this
Twentieth Day of May, 2014

Michelle K. Lee
*Deputy Director of the United States Patent and Trademark Office*